US009720911B2

(12) United States Patent
Lynn (10) Patent No.: US 9,720,911 B2
(45) Date of Patent: *Aug. 1, 2017

(54) SYSTEM AND METHOD FOR VARIABLE BLOCK LOGGING WITH LOG-AHEAD BUFFERS (75) Inventor: Joseph B. Lynn, Plano, TX (US)

(73) Assignee: CA, Inc., New York, NY (US)

(*) Notice: Subject to any disclaimer, the term of this patent is extended or adjusted under 35 U.S.C. 154(b) by 989 days.

This patent is subject to a terminal disclaimer.

(21) Appl. No.: 13/307,590

(22) Filed: Nov. 30, 2011

(65) Prior Publication Data

US 2012/0072395 A1 Mar. 22, 2012

Related U.S. Application Data (63) Continuation of application No. 11/176,744, filed on Jul. 7, 2005, now Pat. No. 8,090,691.

(60) Provisional application No. 60/601,378, filed on Aug. 13, 2004.

(51) Int. Cl.
G06F 7/00 (2006.01)
G06F 17/00 (2006.01)
G06F 17/30 (2006.01)

(52) U.S. Cl.
CPC .. *G06F 17/30008* (2013.01); *G06F 17/30368* (2013.01)

(58) Field of Classification Search
None
See application file for complete search history.

(56) References Cited

U.S. PATENT DOCUMENTS

| 4,507,751 | A | * | 3/1985 | Gawlick | G06F 9/44 |
| 5,369,757 | A | | 11/1994 | Spiro et al. | 714/19 |
| 5,455,947 | A | | 10/1995 | Suzuki et al. | 395/650 |
| 5,499,367 | A | | 3/1996 | Bamford et al. | |
| 5,754,888 | A | | 5/1998 | Yang et al. | 395/872 |
| 5,832,508 | A | | 11/1998 | Sherman et al. | 707/200 |
| 5,906,658 | A | | 5/1999 | Raz | 710/39 |
| 5,966,706 | A | | 10/1999 | Biliris et al. | 707/10 |
| 6,021,408 | A | | 2/2000 | Ledain et al. | 707/8 |
| 6,101,497 | A | | 8/2000 | Ofek | 707/657 |
| 6,131,094 | A | | 10/2000 | Gord | 707/8 |
| 6,189,069 | B1 | | 2/2001 | Parkes et al. | 711/100 |
| 6,321,234 | B1 | | 11/2001 | Debrunner | |

(Continued)

FOREIGN PATENT DOCUMENTS

| EP | 0 758 114 | 2/1997 |
| WO | WO 96/13783 | 5/1996 |

*Primary Examiner* — Sherief Badawi
*Assistant Examiner* — Berhanu Mitiku
(74) *Attorney, Agent, or Firm* — Pillsbury Winthrop Shaw Pittman LLP (57) ABSTRACT A system for logging database transactions comprises a memory (comprising a direct access storage device) operable to store a database, a database log, and a plurality of log buffers associated with the database log. Each log buffer is operable to store at least one log record associated with a database transaction. The system further comprises a processor operable to log a first record of a first database transaction using the database log and write the database log to the storage device. The processor is further operable to log a second record of a second database transaction in a first of the plurality of log buffers substantially concurrently to the database log being written to the storage device.

26 Claims, 2 Drawing Sheets (56) References Cited

U.S. PATENT DOCUMENTS

| | | | |
|---|---|---|---|
| 6,338,146 B1 | 1/2002 | Johnson et al. | 714/4.5 |
| 6,516,314 B1 | 2/2003 | Birkler et al. | 707/8 |
| 6,578,160 B1 | 6/2003 | MacHardy, Jr. et al. | 714/43 |
| 6,721,765 B2 | 4/2004 | Ghosh et al. | |
| 6,732,124 B1 * | 5/2004 | Koseki | G06F 11/1435 |
| 6,745,175 B2 | 6/2004 | Pierce et al. | 707/2 |
| 6,813,623 B2 * | 11/2004 | Wilding | G06F 17/30368 |
| 6,996,580 B2 | 2/2006 | Bae et al. | |
| 7,036,125 B2 | 4/2006 | Basso et al. | 718/104 |
| 7,168,001 B2 | 1/2007 | Johnson et al. | 714/13 |
| 2003/0009477 A1 * | 1/2003 | Wilding | G06F 17/30368 |
| 2004/0010499 A1 | 1/2004 | Ghosh et al. | |
| 2004/0133448 A1 | 7/2004 | Higashi et al. | 705/1 |
| 2005/0071391 A1 | 3/2005 | Fuerderer et al. | |
| 2005/0114321 A1 | 5/2005 | DeStefano et al. | 707/3 |
| 2005/0114505 A1 | 5/2005 | DeStefano et al. | 709/224 |
| 2005/0114707 A1 | 5/2005 | DeStefano et al. | 713/201 |
| 2005/0114708 A1 | 5/2005 | DeStefano et al. | 713/201 |
| 2005/0144299 A1 | 6/2005 | Blevins et al. | 709/230 |
| 2006/0020634 A1 | 1/2006 | Huras et al. | |
| 2006/0036660 A1 | 2/2006 | Lynn | 707/204 |
| 2006/0047684 A1 | 3/2006 | Cherkauer | |
| 2006/0101083 A1 | 5/2006 | Cherkauer et al. | |

* cited by examiner

SYSTEM AND METHOD FOR VARIABLE BLOCK LOGGING WITH LOG-AHEAD BUFFERS

CROSS-REFERENCE TO RELATED APPLICATIONS

This application is a continuation of U.S. patent application Ser. No. 11/176,744, entitled "System and Method for Variable Block Logging with Log-Ahead Buffers," filed Jul. 7, 2005 now U.S. Pat. No. 8,090,691, which claims the benefit of U.S. Provisional Patent Application Ser. No. 60/601,378, entitled "System and Method for Variable Block Logging with Log-Ahead Buffers," filed Aug. 13, 2004, the contents of which are hereby incorporated by reference in their entirety.

TECHNICAL FIELD

This disclosure generally relates to database management and, more specifically, to a system and method for variable block logging with log-ahead buffers.

BACKGROUND

Relational database management systems may utilize an active transaction log file (also referred to as a "transaction journal" or "journal file") or similar facility to record updates done by a transaction to provide transaction integrity and recoverability. This information is also used when the database system fails for some reason and the system needs to be restarted and restored to a "stable state." Typically this stable state means the most recent point where all completed (committed) updates have been written to the database and any in-flight updates (uncommitted) are removed from the database. Conventional database logs use a fixed-block architecture to store the transaction logs that represent the updates made by the transactions. The fixed-block architecture allows the current log buffer to be rewritten to the same log block multiple times (as needed) to ensure that transaction updates that have been committed are recorded on the physical log file direct access storage device before the actual transaction is allowed to commit or complete. In a typical environment a log buffer may be re-written to the log file direct access storage device multiple times. Such writes to the direct access storage device may be triggered, for example, when certain events take place (such as "commits" saving changes in the database), at certain time intervals, when the log buffer is full, or based on other predetermined or dynamic determined conditions. While the log buffer is being written to the log file direct access storage device, other tasks that need to record transaction information in the log buffer or log file may be held until the direct access storage device write is completed, which may introduce delays in transaction processing.

SUMMARY

This disclosure provides a system and method for using a variable format log buffer and log block (direct access storage device file) for logging database transactions. Included in this system and method is memory (including a direct access storage device) operable to store a database, a database log, and a plurality of log buffers associated with the database log. Each log buffer is operable to store at least one log record associated with a database transaction. The system further comprises a processor operable to log a first record of a first database transaction using the database log and write the database log to the storage device. The processor is further operable to log a second record of a second database transaction in a first of the plurality of log buffers substantially concurrently to the database log being written to the storage device.

In another example embodiment, software for logging database transactions is operable to log a first record of a first database transaction using a database log and write the database log to a storage device. The software is further operable to log a second record of a second database transaction in a first log buffer substantially concurrently to the database log being written to the storage device. The details of one or more embodiments of the disclosure are set forth in the accompanying drawings and the description below. Particular features, objects, and advantages of the disclosure will be apparent from the description and drawings and from the claims.

DETAILED DESCRIPTION

Figure 1:
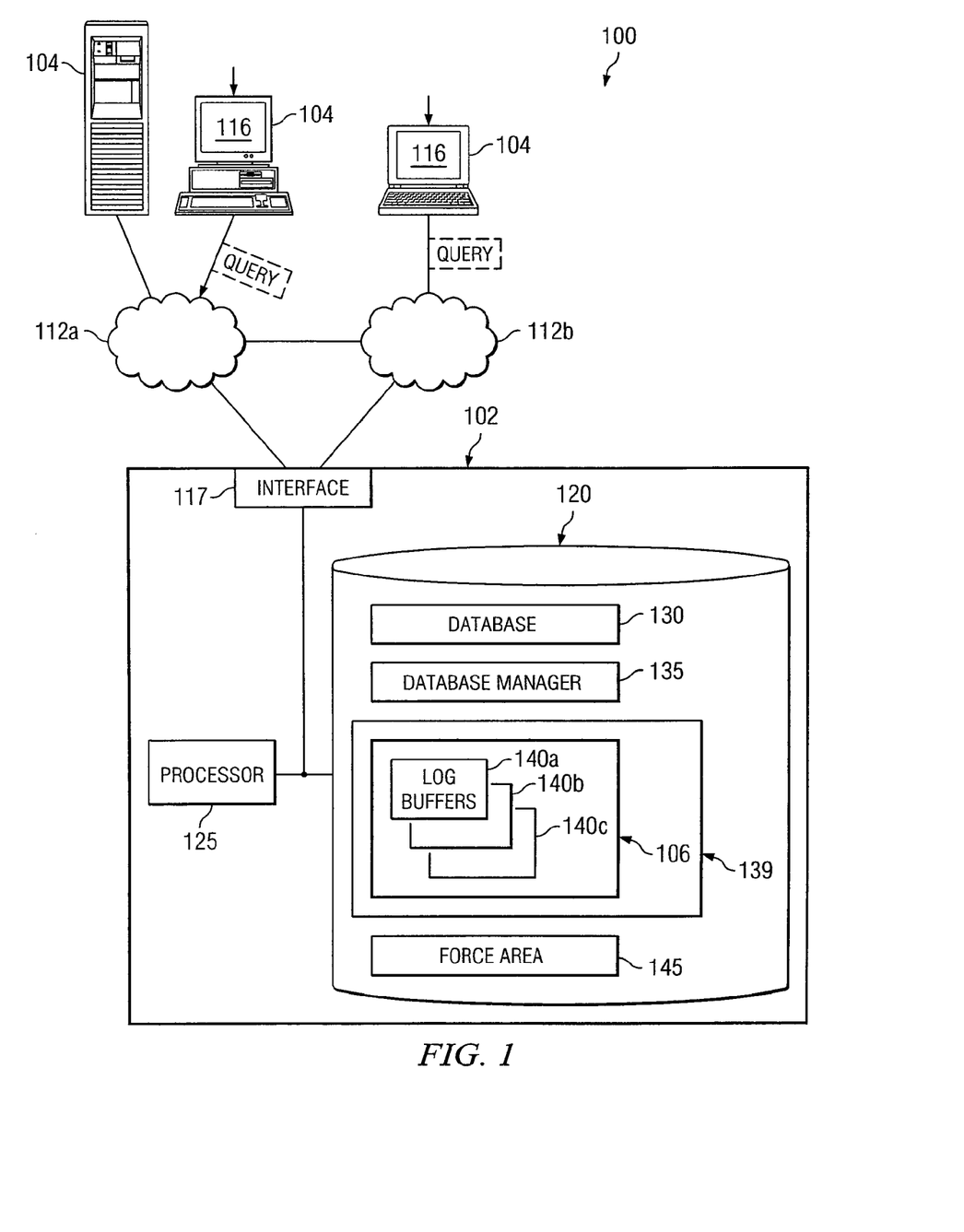
FIG. 1 illustrates an environment implementing database logging using multiple log buffers, according to one aspect of the invention.

FIG. 1 illustrates a relational database environment 100 for storing and retrieving information in at least a portion of enterprise or data processing environment in accordance with a particular implementation of a system and method for using variable logging to record transaction information for a database 130. Generally, environment 100 allows for variable logging of database 130 by using log-ahead buffers. With variable logging, log records are added to a current log buffer (or a first log buffer with space) that is not written until the buffer is full or an event occurs that requests that the buffer be on disk. In this case, the write is often the length of data currently in the buffer. In other words, environment 100 maintains log files for database 130 using multiple log buffers 140, which may allow various processes to take place concurrently with log files being written to a direct access storage device or memory 120. Memory 120 may be physically or logically separate from server 102 to provide additional protection against possible causes of server failure 102. As described in more detail below, memory 120 includes physical blocks, which may be written wholly or partially during a particular write operation. Certain embodiments also provide for fixed logging, in which log buffers 140 have a fixed length corresponding to a block size on memory 120, while other embodiments (alternatively or in combination) use variable logging, allowing log buffers 140 to have a variable length up to a maximum capacity. In other words, in certain embodiments, environment 100 may fill log records left to right in log buffer 140a, issue an I/O whenever a "first" commit is received, and dynamically store other tasks' log records in other log buffers 140b and 140c. In this example, multiple tasks can be simultaneously filling log buffers 140. The term "dynamically," as used herein, generally means that certain processing is determined, at least in part, at run-time based on one or more variables. The term "automatically," as used herein, generally means that the appropriate processing is substantially performed by at least part of distributed application environment 100. It should be understood that "automatically" further contemplates any suitable administrator or other user interaction with environment 100 without departing from the scope of this disclosure.

Returning to the illustrated embodiment, environment 100 may be a distributed client/server system that allows users of clients 104 to submit requests to store or modify and/or retrieve information from database 130, which is maintained on illustrated server 102 (but may reside elsewhere to be managed by server 102, such as in a data warehouse or repository). But environment 100 may also be a standalone computing environment or any other suitable environment, such as an administrator or data manager accessing data stored on server 102, without departing from the scope of this disclosure. Environment 100 may allow access to database 130 using a structured query language (SQL) or other suitable or generic database query language (XML). Database 130 is typically a relational database that uses sets of schemas to describe the tables, columns, and relationships in the tables using basic principles known in the field of database design. But, while described in relational terms, in other embodiments, database 130 may comprise XML documents, flat files, Btrieve files, or comma-separated-value (CSV) files. As database 130 is being managed by server 102, it may be desirable to maintain an active log file (or "journal") 106 documenting "transactions," which generally include any access, change, or command to database 130. Log file 106 may be local or remote, as well as distributed, without departing from the scope of the disclosure. In certain embodiments, whether the transaction is to be logged may be determined by the administrator or system resources or security. Database 130, normally though database manager 135 (described below), tracks operations in a particular log file 106 that is segmented into or supplemented with a plurality of log buffers 140. Log records are added to log file 106 or to a particular log buffer 140 as various database operations are performed. Various embodiments of environment 100 provide for multiple log buffers 140 allowing log records to be buffered while one or more log buffers 140 are being written to memory 120. For example, free or newly activated log buffers 140 can store log records while the contents of other full or to-be-written log buffers 140 are being written to memory 120. This may allow additional transactions to take place while memory 120 is being written to direct access storage device, allowing for greater concurrency in database 130. Moreover, having additional log buffers 140 reduces the chance that all log buffers 140 will be full when a transaction is about to take place, which could require the transaction to be held while log buffer 140 is written to the database. For example, enough buffers 140 may exist so that the time during a write is matched by the number of buffers available. The number and/or size of log buffers 140 may be selected by a user or determined automatically and/or dynamically based on system requirements in order to take advantage of increased performance while limiting the amount of system resources required for log buffers 140. For example, database 130 may allow the user to select between a range of buffers 140, such as between four and ninety-nine. In another example, the number and/or size of log buffers 140 may default to eight and then be determined dynamically based on system usage, so that when usage is relatively high, more or larger buffers 140 are used. In certain embodiments, the write of one log buffer to memory 120 will look at the other log buffers (with active transaction data) to see if more than one log buffer can be written with a single write request. This may save the number of writes as well as processing time. In this example, a maximum of a six log buffers 140 may be written as one request using chained input/output (I/O). This example six buffer write normally represents three tracks (of 3390 direct access storage device). If fewer buffers 140 are available to be written, then as few as a single buffer 140 will be written. Writes to memory 120 are normally performed when a particular log buffer 140 is full or when an event that requires a log buffer 140 to be committed is detected. For example, a "commit" event which saves changes to database 130 could prompt buffered log entries to be saved to direct access storage device 139. During the write to memory 120, additional records may be written to the physical block being written if log buffer 140 is not full. But once a number of log records sufficient to fill log buffer 140 are being written to the physical block, log records for transactions may be sent to another log buffer 140 while the write of current log buffer 140 to memory 120 is being performed, which increases the number of transactions that can be performed simultaneously in the database (also known as "concurrency"). A particular log buffer 140 that is not full is typically not written unless it is requested to be on memory 120 by the event. In certain embodiments, log current buffer writes will be done without waiting on completion for normal maintenance commands. In this case, it may allow more overlap of processing during the log write. Commands that require completion, such as commit commands, may wait for completion as necessary. Other advantages of particular embodiments are described herein or may be understood by those skilled in the art. Of course, particular embodiments may have some, all, or none of the enumerated advantages.

Server 102 includes memory 120 and processor 125 and comprises an electronic computing device operable to receive, transmit, process and store data associated with environment 100. For example, server 102 may be any computer or processing device such as a mainframe, a blade server, general-purpose personal computer, Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system including z/OS, Linux-Intel or Linux/390, UNIX, Windows Server, or any other suitable operating system. According to one embodiment, server 102 may also include or be communicably coupled with a web server and/or an SMTP server.

Memory 120 may include any memory or database module and may take the form of volatile or non-volatile memory including, without limitation, magnetic media, optical media, random access memory, read-only memory, removable media, or any other suitable local or remote memory component. In certain embodiments, at lease a portion of memory 120 is a direct access storage device 139. Illustrated memory 120 also includes database 130, log buffers 140 comprising or added to log file 106, force area 145, database manager 135, which may be any set of logical instructions executed by processor 125 to perform tasks associated with database management and/or responding to queries, including storing information in memory 120, searching database 130, generating responses to queries using information in database 130, restoring portions of database 130 from backup records 106, and numerous other related tasks. In particular, database manager 135 manages generated or received log records, storing log records in log buffers 140, and requesting or managing the write the contents of log buffers 140 to direct access storage device 139. In certain embodiments, database manager 135 may collect, generate, or format statistics involving buffers 140. For example, the first statistical count may represent the number of times the first log buffer 140 is activated. This example count normally occurs when the current buffer 140 in log file 106 is full and no other log buffers 140 are in use. If activated, buffer 140 may include only one record or a full block of records before it is written. A similar count is provided for log buffers 2-nn. For example, certain embodiments may use up to 99 log buffers 140, but any number of buffers 140 may be used up to the availability of memory. The next example statistical counter is the count of times that certain log buffers 140 are full and a transaction wait should occur for a current write to free one or more log buffers 140. If this count is large, the administrator or a component may want to increase the number of log buffers 140. Yet more example statistical counters provide the grouping of multiple log buffers 140 into a single write to direct access storage device 139. The first counter provides for the times that two log buffers 140 are written with a single write. Additional example counts may be provided for writing three buffers, four buffers, five buffers, or six buffers. In general, two buffers often fit per direct access storage device track and so, in these cases, this write of six buffers would represent three tracks of log data.

Database manager 135 is typically software and may be written or described in any appropriate computer language including, for example, C, C++, Java, J#, Visual Basic, assembler, Perl, any suitable version of 4GL, or any combination thereof. As used herein, software generally includes any appropriate combination of software, firmware, hardware, and/or other logic. It will be understood that while database manager 135 is illustrated in FIG. 1 as a single multi-tasked module, the features and functionality performed by this engine may be performed by multiple modules such as, for example, one or more agents or database instances. Further, while illustrated as internal to server 102, one or more processes associated with database manager 135 may be stored, referenced, or executed remotely—in one embodiment, database manager 135 may be referenced by or communicably coupled with applications executing on client 104. Moreover, database manager 135 may be a child or sub-module of another software module (not illustrated) without departing from the scope of this disclosure—indeed database manager 135 and database 130 may comprise the same or child/parent modules without departing from the scope of the disclosure.

Particular embodiments of memory 120 may also include a "force area" file 145 to handle overflows from log file 106 when information needs to be written or recovered (known as a "forced transaction") while log file 106 is currently occupied. Force area 145 may have a block size set to match that of log file 106. Alternatively, if the size of log file 106 is set to be exceptionally large for variable logging applications, Force area 145 may use a smaller block size that would be suitable for handling writes to log file 106, such as the maximum size of log buffers 140.

Server 102 also includes processor 125. Processor 125 executes instructions and manipulates data to perform the operations of server 102 such as, for example, a central processing unit, a blade, an application specific integrated circuit, or a field-programmable gate array. In particular, processor 125 performs any suitable tasks associated with or requested by database manager 135, including the creation, use, and freeing of log buffers 140, as well as writing the contents of log buffers 140 to direct access storage device. Although FIG. 1 illustrates a single processor 125 in server 102, multiple processors 125 may be used according to particular needs and reference to processor 125 is meant to include multiple processors 125 where applicable.

Server 102 may also include interface 117 for communicating with other computer systems, such as client 104, over network 112 in a client-server or other distributed environment. In certain embodiments, server 102 receives queries from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Indeed, while illustrated as two networks, 112a and 112b respectively, network 112 may be a continuous network without departing from the scope of this disclosure, so long as at least portion of network 112 may facilitate communications between senders and recipients of queries and results. In other words, network 112 encompasses any internal and/or external network, networks, sub-network, or combination thereof operable to facilitate communications between various computing components in environment 100. Network 112 may communicate, for example, Internet Protocol packets, Frame Relay frames, Asynchronous Transfer Mode cells, voice, video, data, and other suitable information between network addresses. Network 112 may include one or more local area networks, radio access networks, metropolitan area networks, wide area networks, all or a portion of the global computer network known as the Internet, and/or any other communication system or systems at one or more locations.

Client 104 is any local or remote computing device operable to receive requests from the user via a user interface 116, such as a graphical user interface, a command line interface, or any of numerous other user interfaces. Thus, where reference is made to a particular interface, it should be understood that any other user interface may be substituted in its place. In various embodiments, each client 104 includes at least graphical user interface 116 and comprises an electronic computing device operable to receive, transmit, process and store any appropriate data associated with environment 100. It will be understood that there may be any number of clients 104 communicably coupled to server 102. For example, illustrated clients 104 include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries via graphical user interface 116. As used in this disclosure, client 104 is intended to encompass a personal computer, touch screen terminal, workstation, network computer, kiosk, wireless data port, wireless or wireline phone, personal data assistant, one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or graphical user interface 116. Both the input device and output device may include fixed or removable storage media such as a magnetic computer disk, CD-ROM, or other suitable media to both receive input from and provide output to users of clients 104 through the display, namely graphical user interface 116.

Graphical user interface 116 comprises a graphical user interface operable to allow the user of client 104 to interface with at least a portion of environment 100 for any suitable purpose. Generally, graphical user interface 116 provides the user of client 104 with an efficient and user-friendly presentation of data provided by or communicated within environment 100. For example, graphical user interface 116 may be a front-end of an application executing on client 104 that is operable to submit SQL queries to database 130. Graphical user interface 116 may comprise a plurality of customizable frames or views having interactive fields, pull-down lists, and buttons operated by the user. In one embodiment, graphical user interface 116 presents information associated with queries and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, graphical user interface 116 contemplates any graphical user interface, such as a generic web browser or touch screen, that processes information in environment 100 and efficiently presents the results to the user. Server 102 can accept data from client 104 via the web browser (e.g., Microsoft Internet Explorer or Netscape Navigator) and return the appropriate HTML or XML responses using network 112. For example, server 102 may receive such an SQL query from client 104 using the web browser and then execute the parsed query to store and/or retrieve information in database 130.

In operation, log buffers 140 are used to store log records of database transactions as they occur. Server 102 monitors activity in log buffers 140 to determine when information needs to be written to memory 120, specifically storage device 139. For example, certain events, such as transactions issuing a commit request, may trigger a write to direct access storage device 139. Also, log buffers 140 may be written as they become full. When a need to write to direct access storage device 139 arises, server 102 (typically via example database manager 135) initiates the write. During the write, new log records may be stored in new or activated log buffers 140 and additional records may even be written as part of the write of log buffer 140. For example, if the particular log buffer 140 being written is not filled to the size of a track on direct access storage device, then remaining space on the track may be filled during the same write operation using records from other log buffers 140 or new log records being received during the write. This may advantageously reduce the number of writes to direct access storage device 139, thus conserving system resources, such as processing resources. So long as there is available log buffer 140 space available, logged database operation may continue. Occasionally, all log buffers 140 may be filled, which may require transactions requiring log space to be held. Similarly, there may be times when a second request triggering a write to direct access storage device 139 will be received while another write is taking place, which may require transactions to be held. But the use of multiple log buffers 140 may significantly reduce the number of times that transactions must be held, improving system concurrency and user availability.

Figure 2:
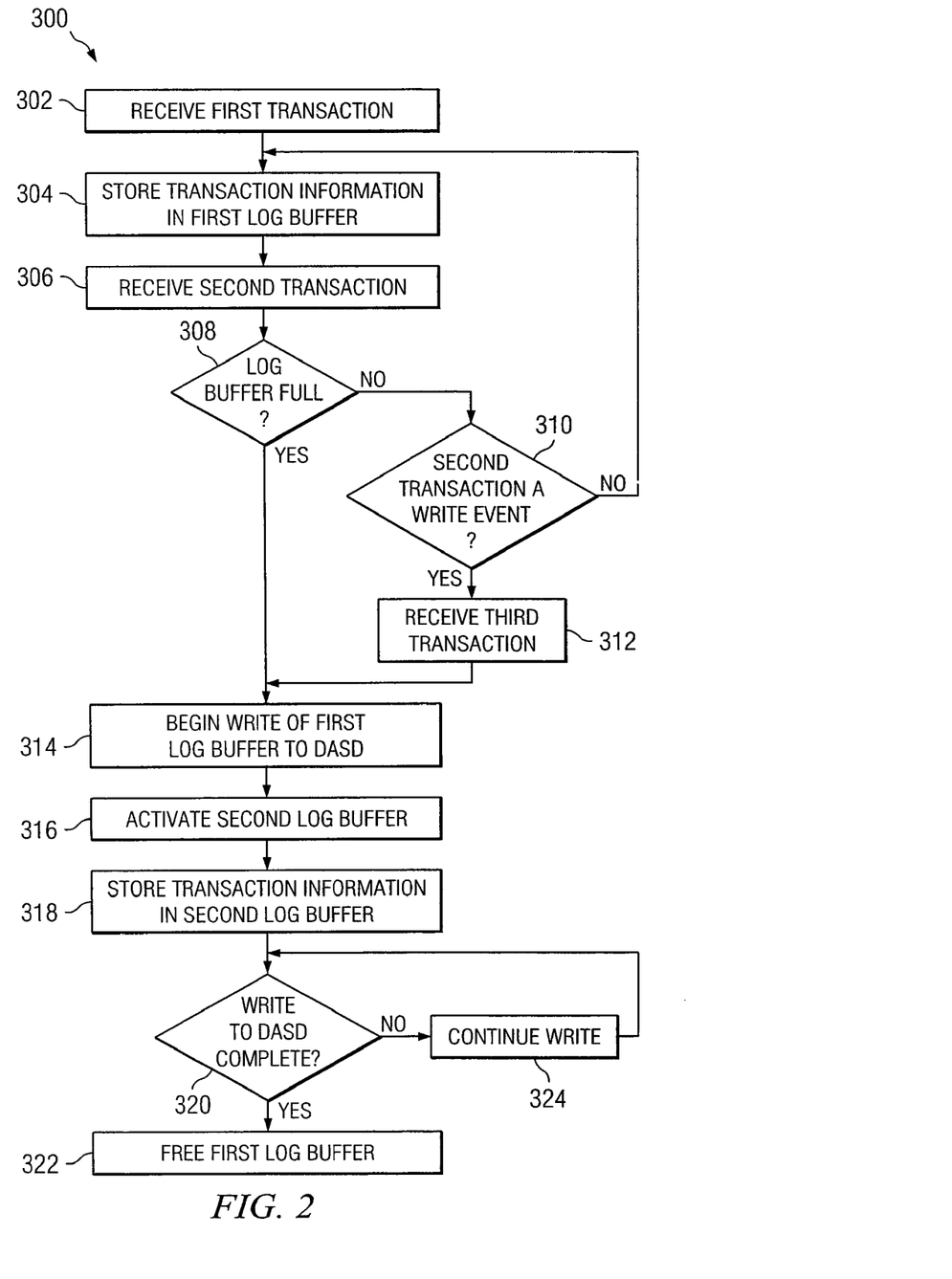
FIG. 2 is a flow chart illustrating an example method of database logging using multiple log buffers, according to one aspect of the invention.

FIG. 2 is a flow chart illustrating an example method 300 for logging database transactions using multiple log buffers 140. Method 300 is described in respect to system 100 and, more specifically, to database manager 135. However, any other suitable system, server, or software may use or implement method 300 or other analogous technique to dynamically log transactions without departing from the scope of this disclosure.

In illustrated method 300, server 102 receives or executes a particular database transaction at step 302. As described above, this task may be any logged, audited, or to-be committed transaction including, for example, a query, a command, a security or administrative task, a command line entry, or any other suitable communication that may be logged or committed to memory 120. At step 304, database manager 135 stores one or more log records for the particular transaction in a first log buffer 140a of log file 106 as appropriate. Database manager 135 continues to receive log records and store them in log buffer 140a until a write to memory 120 (or its component direct access storage device 139) is appropriate or efficacious, as shown by step 306. This write may be performed because a particular task requires a write to memory 120, because one or more log buffers 140 are full, or for any other reason for which a write or commit to direct access storage device 139 may be useful. For example, database manager 135 determines if the current log file 106 or log buffer 140a is full at decisional step 308. If the current buffer 140a is not full, then database manager 135 detects whether the transaction is a commit or other triggering event, such as a task requiring a write to direct access storage device 139, is received, as shown by decisional step 310. When a write is to be performed, database manager 135 begins the write to direct access storage device 139 at step 314. In certain embodiments, if an additional trigger is received, database manager 135 holds this write task at step 312 until the current write to direct access storage device 139 is completed. Regardless, during the write, database manager 135 may receive information associated with another database transaction, as indicated at step 312. If tasks are not being held for an additional trigger, then database manager 135 may determine whether additional space in one of the log buffers 140 is available. If additional space is available for logging, then database manager 135 activates the next log buffer 140b (often in sequence from left to right) at step 316. The additional received transactions are then stored in the now active log buffer 140b at step 318. Database manager 135 continues to receive or generate log records and store them in the second log buffer 140b until a write to memory 120 is appropriate or efficacious.

Returning to the first log buffer 140a, if the write of the current log buffer 140a is not complete at decisional step 320, execution proceeds to step 324, where database manager 135 continues writing the current log buffer 140a, monitoring for additional triggers or filled buffer capacity that may require tasks to be held. Once the write of the current log buffer 140a is complete, database manager 135 may clear or free all or part of that log buffer 140a at step 322.

While not illustrated, database manager 135 may then determine whether additional buffers may be written to direct access storage device 139 in the current write operation. For example, if there is space left on a track being written, database manager 135 may write additional records from other log buffers 140 up to the end of the track. If additional log buffers 140 may be written, database manager 135 begins writing the next log buffer 140 to direct access storage device 139. In this case, the next log buffer 140 is written in the same manner as described above. If there are no additional buffers to be written, then server 102 may determine whether another write to direct access storage device is required. For example, if server 102 received an additional trigger requiring a write to direct access storage device while the previous write was being performed, then the write for the next task may be performed. In such a case, execution would return to step 308, for example, thereby beginning a new write operation. Otherwise, server 102 may repeat some or all of the described techniques, such as from step 302, until database operation is interrupted.

The preceding flow chart presents an example method 300 for logging using multiple log buffers 140, but numerous other similar or distinct methods could be employed or implemented as well. In particular, any method of operation suitable for use with any of the embodiments of environment 100 described herein is contemplated within this disclosure. Accordingly, many of the steps in this flowchart may take place simultaneously and/or in different orders than as shown. Moreover, environment 100 may use methods with additional steps, fewer steps, and/or different steps, so long as the methods, are consistent with any of the techniques for logging using multiple log buffers 140 described or suggested herein.

Although this disclosure has been described in terms of certain embodiments and generally associated methods, alterations and permutations of these embodiments and methods will be apparent to those skilled in the art. For example, different methods of determining when to write to direct access storage device, how to determine which log buffers 140 are written, and numerous other possible variations are contemplated within the scope of this disclosure. Accordingly, the above description of example embodiments does not constrain the scope of the claims. Other changes, substitutions, and alterations are also possible without departing from the spirit and scope of this disclosure.

What is claimed is:

1. A system for variable block logging with log-ahead buffers, wherein the system comprises a processor configured to:
   determine a number and a size of log buffers that are made available or remain available, to log records associated with database transactions in a storage device based on a statistic that relates to logging previous records associated with previous database transactions in the storage device;
   log a current record associated with a current database transaction into a current one of the available log buffers until the current log buffer has been filled or an event that requests committing the current log buffer to the storage device occurs;
   commit the current record logged in the current log buffer to a track on the storage device in a current write operation in response to determining that the current log buffer has been filled or the event that requests committing the current log buffer to the storage device has occurred;
   log a new record associated with a new database transaction that is received during the current write operation into a newly activated one of the available log buffers substantially concurrently with the current write operation committing the current record to the track on the storage device; and
   commit the new record logged in the newly activated log buffer to the track on the storage device in response to the track on the storage device having additional space subsequent to the current write operation committing the current record to the track on the storage device.

2. The system of claim 1, wherein the statistic includes a number of times that the log buffers have been activated, a number of times that a transaction wait has occurred because the log buffers have been filled, or a number of times that chained input/output was used to perform multiple write operations in one write request.

3. The system of claim 2, wherein the processor is further configured to increase the number of the log buffers available to log the records in response to determining that the number of times that the transaction wait has occurred includes a high count.

4. The system of claim 1, wherein the processor is further configured to:
   increase the number or the size of the log buffers available to log the records in response to usage associated with the system being high; and
   decrease the number or the size of the log buffers available to log the records in response to usage associated with the system being low.

5. The system of claim 1, wherein the determined size of the log buffers available to log the records includes a variable length less than or equal to a maximum capacity associated with the storage device.

6. The system of claim 5, wherein the processor is further configured to:
   maintain a log file to document the current database transaction and the new database transaction logged in the current log buffer and the newly activated log buffer; and
   perform a forced transaction to handle overflow from the log file if information needs to be written to or recovered from the log file while occupied, wherein the storage device has a force area file having a block size that matches a block size associated with the log file or a smaller size that corresponds to the variable length associated with the available log buffers to handle the overflow from the log file.

7. A method for variable block logging with log-ahead buffers, comprising:
   determining a number and a size of log buffers that are made available or remain available, to log records associated with database transactions in a storage device based on a statistic that relates to logging previous records associated with previous database transactions in the storage device;
   logging a current record associated with a current database transaction into a current one of the available log buffers until the current log buffer has been filled or an event that requests committing the current log buffer to the storage device occurs;
   committing the current record logged in the current log buffer to a track on the storage device in a current write operation in response to determining that the current log buffer has been filled or the event that requests committing the current log buffer to the storage device has occurred;

logging a new record associated with a new database transaction that is received during the current write operation into a newly activated one of the available log buffers substantially concurrently with the current write operation committing the current record to the track on the storage device; and committing the new record logged in the newly activated log buffer to the track on the storage device in response to the track on the storage device having additional space subsequent to the current write operation committing the current record to the track on the storage device.

8. The method of claim 7, wherein the statistic includes a number of times that the log buffers have been activated, a number of times that a transaction wait has occurred because the log buffers have been filled, or a number of times that chained input/output was used to perform multiple write operations in one write request.

9. The method of claim 8, further comprising increasing the number of the log buffers available to log the records in response to determining that the number of times that the transaction wait has occurred includes a high count.

10. The method of claim 7, further comprising:
increasing the number or the size of the log buffers available to log the records in response to usage associated with the system being high; and
decreasing the number or the size of the log buffers available to log the records in response to usage associated with the system being low.

11. The method of claim 7, wherein the determined size of the log buffers available to log the records includes a variable length less than or equal to a maximum capacity associated with the storage device.

12. The method of claim 11, further comprising:
maintaining a log file to document the current database transaction and the new database transaction logged in the current log buffer and the newly activated log buffer; and
performing a forced transaction to handle overflow from the log file if information needs to be written to or recovered from the log file while occupied, wherein the storage device has a force area file having a block size that matches a block size associated with the log file or a smaller size that corresponds to the variable length associated with the available log buffers to handle the overflow from the log file.

13. A system for variable block logging with log-ahead buffers, comprising:
a storage device; and
a processor configured to:
log a current record into a current log buffer until the current log buffer has been filled or an event that requests committing the current log buffer to the storage device occurs; and
perform a current write operation to commit the current record logged in the current log buffer to a track on the storage device in response to determining that the current log buffer has been filled or the event that requests committing the current log buffer to the storage device has occurred;
activate a free or new log buffer;
log a new record received during the current write operation into the activated log buffer substantially concurrently with the current write operation committing the current record logged in the current log buffer to the track on the storage device;
determine whether the track on the storage device will have additional space after the current write operation committing the current record logged in the current log buffer to the track on the storage device; and
commit the new record logged in the activated log buffer to the additional space associated with the track on the storage device during the current write operation in response to the track on the storage device having the additional space.

14. The system of claim 13, wherein the processor is further configured to:
collect a statistic involving the current log buffer and the activated log buffer, wherein the statistic includes a number of times that the current log buffer and the activated log buffer have been activated, a number of times that the current log buffer has been filled and a transaction wait until the current log buffer has been freed occurs, or a number of times that the database manager used chained input/output to perform multiple write operations in one write request; and
dynamically determine a number of available log buffers and a size of the available log buffers based on the statistic, wherein to dynamically determine the number of available log buffers and the size of the available log buffers, the processor is further configured to:
increase the number of available log buffers in response to determining that the number of times that the transaction wait has occurred includes a high count;
increase the number of available log buffers or the size of the available log buffers during high system usage; and
decrease the number of available log buffers or the size of the available log buffers during low system usage.

15. The system of claim 13, wherein the processor is further configured to:
complete the current write operation without committing the new record logged in the activated log buffer to the track on the storage device in response to determining that the track on the storage device does not have the additional space or that the additional space associated with the track on the storage cannot store the new record; and
perform a next write operation to commit the new record logged in the activated log buffer to a second track on the storage device in response to determining that the activated log buffer has been filled or a request to commit the activated log buffer to the storage device has occurred.

16. The system of claim 15, wherein to perform the next write operation, the processor is further configured to:
activate a second free or new log buffer;
log an additional record received during the next write operation into the second activated log buffer substantially concurrently with the next write operation committing the new record to the second track on the storage device; and
commit the additional record logged in the second activated log buffer to the second track on the storage device during the next write operation in response to determining that the second track on the storage device has additional space to store the additional record subsequent to the next write operation committing the new record to the second track on the storage device.

17. The system of claim 15, wherein the processor is further configured to use chained input/output to perform the current write operation and the next write operation in one write request and free the current log buffer and the activated log buffer in response to completing the current write operation and the next write operation in the one write request.

18. The system of claim 13, wherein the current log buffer and the activated log buffer have a fixed length corresponding to a block size on the storage device or a variable length corresponding to a maximum capacity associated with the storage device, and wherein the track on the storage device has a size that fits an amount of data corresponding to two log buffers that have been filled.

19. The system of claim 13, wherein the processor is further configured to:
maintain a log file segmented into or supplemented with the current log buffer and the activated log buffer to document the database transaction logged in the current log buffer and the activated log buffer, wherein the storage device has a force area file to handle overflow from the log file when information needs to be written or recovered; and
perform a forced transaction to handle the overflow from the log file in response to determining that information needs to be written or recovered while the log file is currently occupied, wherein a block size associated with the force area file matches a block size associated with the log file or a smaller size that corresponds to a maximum size associated with the current log buffer or the activated log buffer.

20. A method for variable block logging with log-ahead buffers, comprising:
receiving a current record associated with a database transaction;
logging the current record into a current log buffer until the current log buffer has been filled or an event that requests committing the current log buffer to a storage device occurs; and
performing a current write operation to commit the current record logged in the current log buffer to a track on the storage device in response to determining that the current log buffer has been filled or the event that requests committing the current log buffer to the storage device has occurred, wherein performing the current write operation includes:
activating a free or new log buffer;
logging a new record received during the current write operation into the activated log buffer substantially concurrently with the current write operation committing the current record logged in the current log buffer to the track on the storage device;
determining whether the track on the storage device will have additional space after the current write operation committing the current record logged in the current log buffer to the track on the storage device; and
committing the new record logged in the activated log buffer to the additional space associated with the track on the storage device during the current write operation in response to determining that the track on the storage device has the additional space.

21. The method of claim 20, further comprising:
collecting a statistic involving the current log buffer and the activated log buffer, wherein the statistic includes a number of times that the current log buffer and the activated log buffer have been activated, a number of times that the current log buffer has been filled and a transaction wait until the current log buffer has been freed occurs, or a number of times that the database manager used chained input/output to perform multiple write operations in one write request; and
dynamically determining a number of available log buffers and a size of the available log buffers based on the statistic, wherein dynamically determining the number of available log buffers and the size of the available log buffers includes:
increasing the number of available log buffers in response to determining that the number of times that the transaction wait has occurred includes a high count;
increasing the number of available log buffers or the size of the available log buffers during high system usage; and
decreasing the number of available log buffers or the size of the available log buffers during low system usage.

22. The method of claim 20, further comprising:
completing the current write operation without committing the new record logged in the activated log buffer to the track on the storage device in response to determining that the track on the storage device does not have the additional space or that the additional space associated with the track on the storage cannot store the new record; and
performing a next write operation to commit the new record logged in the activated log buffer to a second track on the storage device in response to determining that the activated log buffer has been filled or a request to commit the activated log buffer to the storage device has occurred.

23. The method of claim 22, wherein performing the next write operation includes:
activating a second free or new log buffer;
logging an additional record received during the next write operation into the second activated log buffer substantially concurrently with the next write operation committing the new record to the second track on the storage device; and
committing the additional record logged in the second activated log buffer to the second track on the storage device during the next write operation in response to determining that the second track on the storage device has additional space to store the additional record subsequent to the next write operation committing the new record to the second track on the storage device.

24. The method of claim 20, wherein a database manager uses chained input/output to perform the current write operation and the next write operation in one write request and frees the current log buffer and the activated log buffer in response to completing the current write operation and the next write operation in the one write request.

25. The method of claim 20, wherein the current log buffer and the activated log buffer have a fixed length corresponding to a block size on the storage device or a variable length corresponding to a maximum capacity associated with the storage device, and wherein the track on the storage device has a size that fits an amount of data corresponding to two log buffers that have been filled.

26. The method of claim 20, further comprising:
maintaining a log file segmented into or supplemented with the current log buffer and the activated log buffer to document the database transaction logged in the current log buffer and the activated log buffer, wherein the storage device has a force area file to handle overflow from the log file when information needs to be written or recovered; and
performing a forced transaction to handle the overflow from the log file in response to determining that information needs to be written or recovered while the log file is currently occupied, wherein a block size associated with the force area file matches a block size associated with the log file or a smaller size that corresponds to a maximum size associated with the current log buffer or the activated log buffer.

* * * * *